US009017195B2

(12) United States Patent
Haupt et al.

(10) Patent No.: US 9,017,195 B2
(45) Date of Patent: Apr. 28, 2015

(54) ARRANGEMENT FOR LUBE OIL SUPPLY A CHAIN DRIVE DRIVING A TRANSMISSION OIL PUMP ARRANGED OFFSET THE AXIS OF A TORQUE CONVERTER

(71) Applicant: ZF Friedrichshafen AG, Friedrichshafen (DE)

(72) Inventors: Josef Haupt, Tettnang (DE); Horst Roegner, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 246 days.

(21) Appl. No.: 13/667,150

(22) Filed: Nov. 2, 2012

(65) Prior Publication Data
US 2013/0123053 A1    May 16, 2013

(30) Foreign Application Priority Data

Nov. 14, 2011  (DE) .......................... 10 2011 086 276

(51) Int. Cl.
*F16H 57/04* (2010.01)
(52) U.S. Cl.
CPC ........ *F16H 57/0441* (2013.01); *F16H 57/0424* (2013.01)
(58) Field of Classification Search
CPC   F16H 57/0424; F16H 57/0489; F16H 57/049
USPC .................... 474/43, 45, 91; 60/358
See application file for complete search history.

(56) References Cited

U.S. PATENT DOCUMENTS

| 4,841,797 | A  | * | 6/1989  | Cerrington et al. ............. 74/467 |
| 5,014,741 | A  | * | 5/1991  | Taguchi ....................... 184/6.12 |
| 5,522,476 | A  | * | 6/1996  | Holman ....................... 184/6.12 |
| 6,227,333 | B1 | * | 5/2001  | Scheib et al. ................ 184/6.22 |
| 6,357,228 | B1 | * | 3/2002  | Botosan et al. ................. 60/330 |
| 7,281,906 | B2 | * | 10/2007 | Tanikawa et al. ............. 417/310 |
| 8,096,115 | B2 | * | 1/2012  | List ................................ 60/358 |
| 8,366,575 | B2 | * | 2/2013  | Ariga et al. .................... 474/91 |

(Continued)

FOREIGN PATENT DOCUMENTS

DE   10 2006 035 133 A1   1/2008
DE   20 2010 002 882 U1   7/2010

(Continued)
OTHER PUBLICATIONS

German Search Report Corresponding to DE 10 2011 086 276.5.

*Primary Examiner* — William E Dondero
*Assistant Examiner* — Minh Truong
(74) *Attorney, Agent, or Firm* — Davis & Bujold, P.L.L.C.; Michael J. Bujold

(57) ABSTRACT

An arrangement for supplying oil to a chain drive which drives a transmission oil pump that is axially offset relative to a torque converter and embedded in an intermediate plate in a vehicle having a torque converter. The driven sprocket of the chain drive is supported by a converter neck mounted in a centering plate. A seal is provided between the converter neck and the sprocket and is arranged adjacent the sliding fit between the converter neck and the sprocket. To compensate for the suppression of lubrication of the seal, the neck bearing and the chain drive, a valve is integrated in the intermediate plate, and a duct is provided in the plane, in which the centering plate is screwed to the intermediate plate, such that excess oil flowing from the valve is selectively directed to the seal, the neck bearing and the chain drive.

8 Claims, 2 Drawing Sheets

(56) References Cited

U.S. PATENT DOCUMENTS

| | | | | |
|---|---|---|---|---|
| 2009/0286641 | A1* | 11/2009 | List | 474/202 |
| 2010/0151993 | A1* | 6/2010 | Ike et al. | 477/138 |
| 2011/0132141 | A1* | 6/2011 | Mizuno et al. | 74/730.1 |
| 2012/0297895 | A1* | 11/2012 | Kapas et al. | 73/862.193 |
| 2013/0283972 | A1* | 10/2013 | Yamamoto et al. | 74/665 B |

FOREIGN PATENT DOCUMENTS

| | | |
|---|---|---|
| DE | 10 2010 001 864 A1 | 8/2011 |
| JP | 2006-064009 A | 3/2006 |
| JP | 2006-275258 A | 10/2006 |
| JP | 2007-107611 A | 4/2007 |
| WO | 2011/108316 A1 | 9/2011 |

* cited by examiner

ARRANGEMENT FOR LUBE OIL SUPPLY A CHAIN DRIVE DRIVING A TRANSMISSION OIL PUMP ARRANGED OFFSET THE AXIS OF A TORQUE CONVERTER

This application claims priority from German patent application serial no. 10 2011 086 276.5 filed Nov. 14, 2011.

FIELD OF THE INVENTION

The present invention relates to an arrangement for supplying lubrication oil to a chain drive for driving a transmission oil pump positioned axially offset relative to the torque converter in a motor vehicle having a torque converter.

BACKGROUND OF THE INVENTION

In automatic transmissions, a transmission oil pump is needed to provide pressure and lubrication media for the supply of hydraulically actuated frictional shifting elements and for the lubrication of gearteeth and bearing points of the transmission.

JP 2006-064009 A describes a transmission oil pump that is arranged axially parallel to the torque converter of a vehicle, which is driven by a chain drive, wherein the chain drive pinion is driven by the converter neck and is mounted by means of a slide bearing in the converter bell. In this case the chain drive pinion is statically sealed by a sealing ring against the outer diameter of the converter neck and dynamically sealed by a rectangular ring against the impeller shaft.

DE 10 2006 035 133 A1 by the present applicant describes a pump drive mechanism of a transmission oil pump of an automatic transmission, which is arranged axially parallel to the torque converter, wherein the transmission oil pump is driven by a chain sprocket wheel, itself driven by a pump impeller of the torque converter. In this case the pump impeller of the torque converter is connected to a converter hub which, starting from the pump impeller, extends in a direction away from the drive motor, being mounted radially by a radial bearing in or on a wall of the automatic transmission fixed on the transmission housing and, on the side of the radial bearing that faces away from the sprocket teeth, having a driving profile which engages with interlock in a corresponding driving profile of the converter turbine.

In the known pump drive mechanism, it is provided that, between the radial bearing and the driving profile of the converter hub when viewed axially, a radial sealing O-ring is positioned between the converter hub and the converter neck, and the converter neck itself is mounted on the transmission housing by means of a radial bearing and rotationally sealed relative to the housing.

From the prior art, it is also known to drive a transmission oil pump of an automatic transmission, the pump being arranged axially offset relative to the torque converter, by means of a chain drive arranged behind a centering plate in which the torque converter is also mounted, such that the driven sprocket wheel of the chain drive is mounted on the converter neck which is made as a through-shaft and is functionally connected to the converter neck by means of an axially displaceable driving profile.

In this case the mounting of the driven sprocket wheel is made axially displaceable and is in the form of a narrow clearance fit. In this way the sprocket wheel is advantageously axially decoupled from the torque converter, so that the chain of the chain drive can be guided without drift. Moreover, thanks to the narrow clearance fit, the internal pressure of the converter can be sealed in with low leakage losses and the leakage can be used in a selective manner for wetting the converter neck seal on the outside, for lubricating the converter neck mounting and for lubricating the chain drive.

Disadvantageously, however, when a vehicle is stationary and particularly after a longer period at rest, the toroidal inside space of the converter can partially drain through the gap seal of the sprocket wheel, i.e. through the narrow clearance, and when the motor is restarted this results in delayed starting-off of the vehicle since the torque converter first has to be filled.

In the prior art the lubrication pressure limiting valve of the transmission lubrication oil supply as a whole is integrated in the hydraulic transmission control unit.

SUMMARY OF THE INVENTION

The purpose of the present invention is to indicate an arrangement for supplying lubrication oil to the chain drive for driving a transmission oil pump embedded in an intermediate plate and arranged axially offset relative to the torque converter in a motor vehicle having a torque converter, in which the sprocket wheel of the chain drive is mounted in a converter neck, itself mounted in a centering plate adjacent to the torque converter and functionally connected to the converter neck by means of an axially displaceable driving profile, by virtue of such an arrangement, draining of the toroidal inside space of the torque converter after the vehicle has been stationary for a longer period, and hence delayed start-off when the motor is restarted, are largely avoided.

It is proposed, in order to prevent draining of the toroidal inside space of the torque converter after the vehicle has been at rest for a longer period, to provide between the converter neck and the driven sprocket wheel of the chain drive, a static, hermetic seal which is arranged in the area of the sliding fit between the converter neck and the sprocket wheel, and to compensate for the consequent suppression of the lubrication of the converter neck seal, the converter neck bearing and the chain drive, by integrating the lubrication pressure limiting valve of the transmission lubricating oil supply as a whole in the intermediate plate.

In a preferred embodiment of the invention the seal is in the form of an O-ring between the converter neck and the driven sprocket wheel of the chain drive.

Furthermore, the excess oil flow emerging from the lubrication pressure limiting valve of the transmission lubrication oil supply as a whole is directed selectively by way of an overflow duct provided in the plane in which the centering plate and the intermediate plate are screwed together, to the converter neck seal, the converter neck bearing and the chain drive.

BRIEF DESCRIPTION OF THE DRAWINGS

Below, the invention is explained in more detail with reference to the attached figures, which show.

DETAILED DESCRIPTION OF THE PREFERRED EMBODIMENTS

The structure of automatic transmissions that comprise a torque converter and a transmission oil pump/supply driven by a chain drive and positioned axially offset relative to the torque converter is very well known to those familiar with the subject, so in the description of the figures only the components relevant for the purposes of the invention will be described and explained in detail. The same components are given the same indexes.

Figure 1:
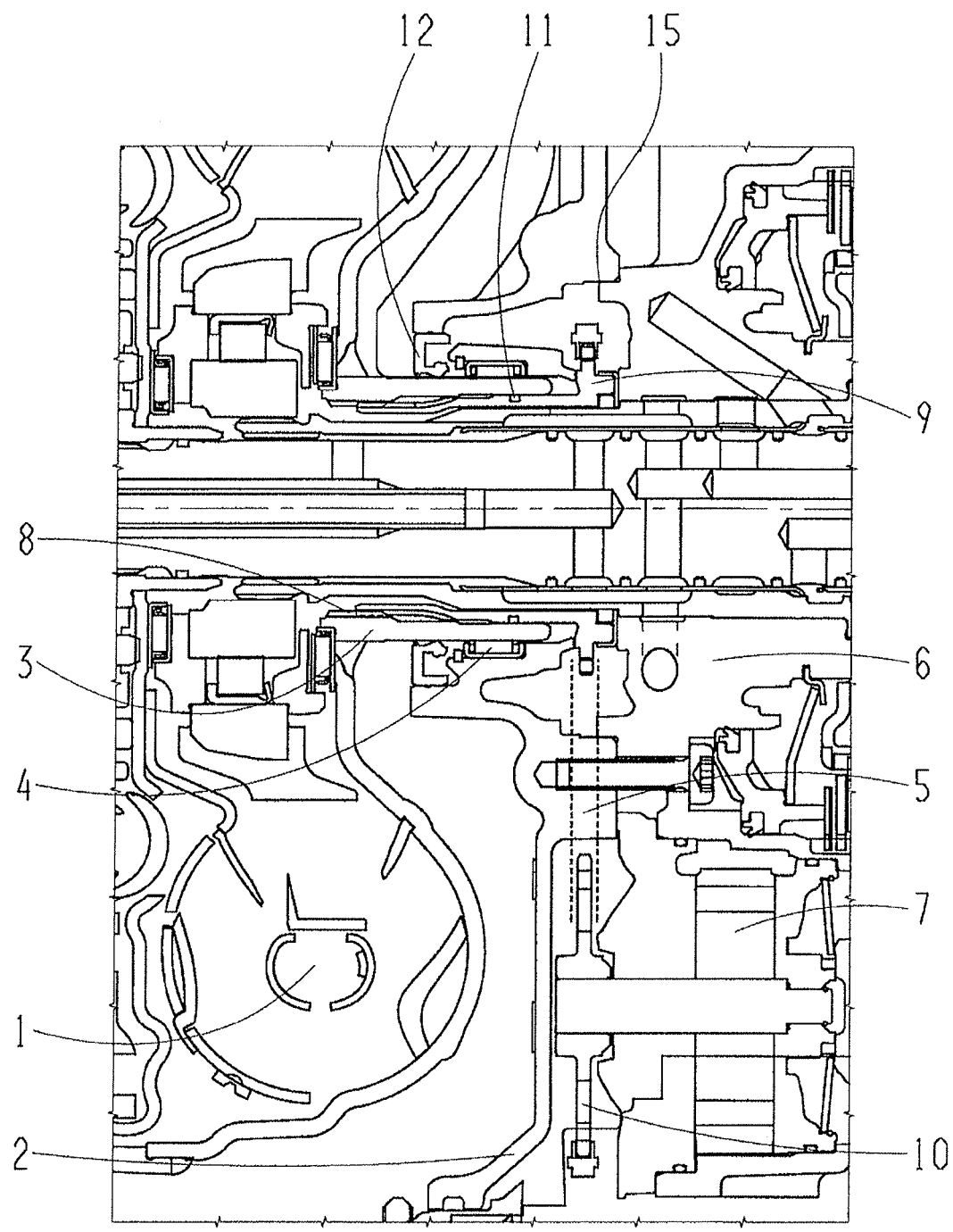
FIG. 1: A schematic sectional view of part of an automatic transmission comprising an arrangement designed according to the invention for supplying lubrication oil to the chain drive for driving the transmission oil pump, to illustrate the invention and the components relevant thereto.

FIG. 1 shows part of an automatic transmission comprising a torque converter 1, which is mounted in a centering plate 2 adjacent to the torque converter 1; the converter neck 3 is mounted in the centering plate 2 by means of a bearing 4. As viewed axially, behind the centering plate 2 and thus immediately on the side of the centering plate 2 opposite to the torque converter 1 is arranged a chain drive 5 by which a transmission oil pump 7 embedded in an intermediate plate 6 is driven. The intermediate plate 6 is screwed to the centering plate 2.

The driven sprocket wheel 9 of the chain drive 5 is mounted in the converter neck 3, which is in the form of a through-shaft, and is functionally connected by an axially displaceable driving profile 8 to the converter neck 3. In FIG. 1 the sprocket wheel of the chain drive 5 connected to the transmission oil pump is indexed 10.

According to the prior art the axially displaceable mounting of the driven sprocket wheel 9 of the chain drive 5 is formed as a narrow clearance fit. This narrow clearance fit allows small leakage losses, which are used for wetting the seal 12 of the converter neck 3 on the outside as viewed radially, for lubricating the converter neck bearing 4, and for lubricating the chain drive 5.

To avoid the thereby created problem of draining of the torque converter 1 during longer periods when the vehicle is at rest, according to the invention a static, hermetic seal is provided between the converter neck 3 and the driven sprocket wheel 9 of the chain drive 5, the seal being in the form of an O-ring 11 and being arranged in the area of the sliding fit between the converter neck 3 and the sprocket wheel 9.

Figure 2:
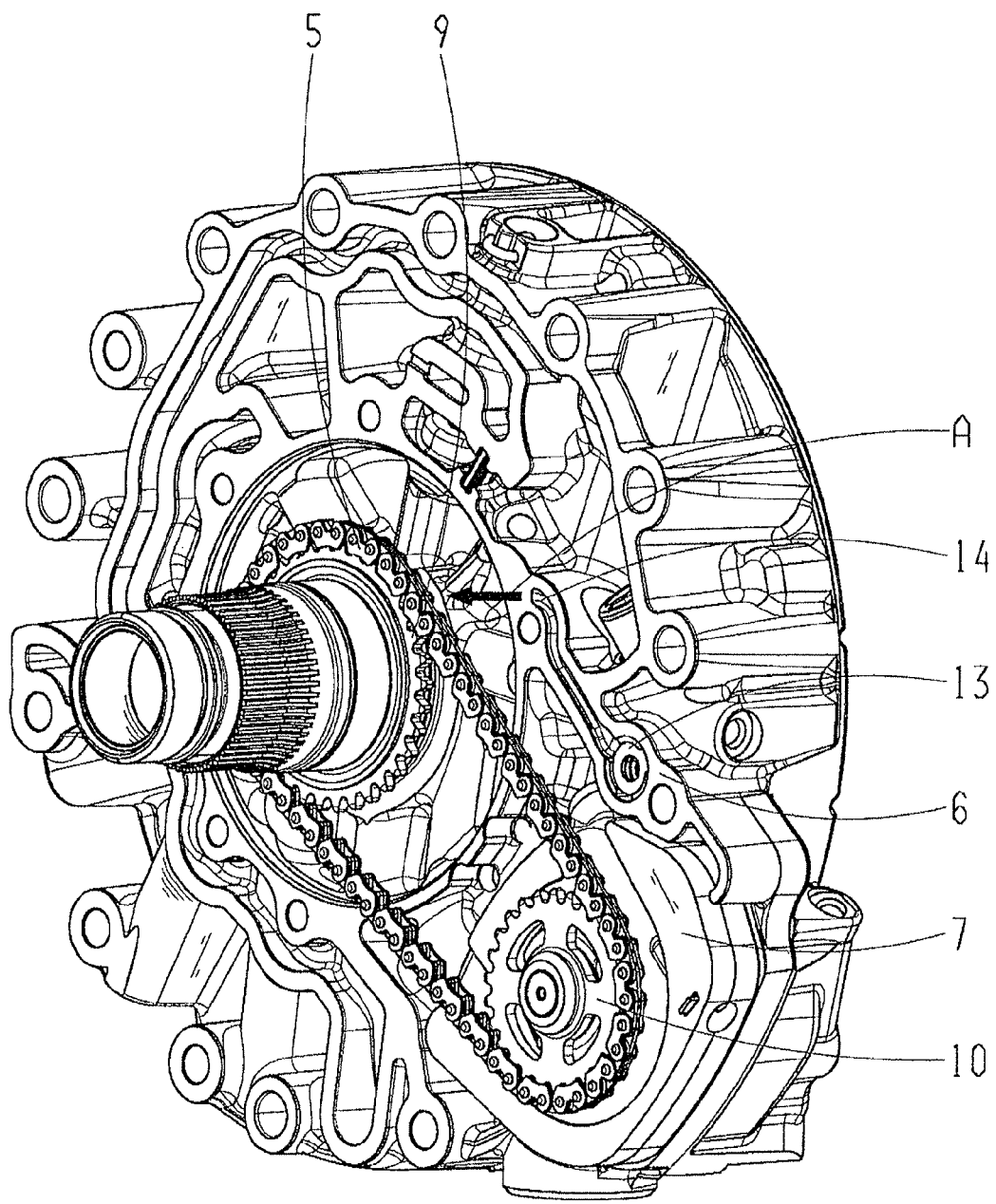
FIG. 2: A schematic view showing the intermediate plate of the embodiment illustrated in FIG. 1.

According to the invention, and referring to FIG. 2, in order to compensate for the suppression by the hermetic seal of the lubrication of the converter neck seal 12, the converter neck bearing 4 and the chain drive 5, the lubrication pressure limiting valve 13 of the transmission lubrication oil supply as a whole is integrated in the intermediate plate 6, in contrast to the prior art in which the lubrication pressure limiting valve of the transmission lubrication oil supply as a whole is integrated in the hydraulic transmission control unit.

Moreover, in the plane in which the centering plate 2 is screwed to the intermediate plate 6, a duct 14 is provided, by way of which the excess oil flow emerging from the lubrication pressure limiting valve 13 is directed selectively to the converter neck seal 12, the converter neck bearing 4 and the chain drive 5. The outlet of the duct 14 is indexed 15 in FIG. 1. The arrow A in FIG. 2 indicates the direction of the oil jet emerging from the duct 14.

Thanks to the concept according to the invention, on the one hand, draining of the converter is prevented and, on the other hand, lubrication of the converter neck seal 12, the converter neck bearing 4 and the chain drive 5 is ensured, so that oil which is not used in the prior art and is sprayed into the oil sump, is instead used for that purpose here.

Advantageously, the intermediate plate 6, the centering plate 2, the transmission oil pump 7 and the chain drive 5 form a structural group that can be preassembled.

INDEXES

1 Torque converter
2 Centering plate
3 Converter neck
4 Converter neck bearing
5 Chain drive
6 Intermediate plate
7 Transmission oil pump/supply
8 Driving profile
9 Driven sprocket wheel of the chain drive 5
10 Sprocket wheel of the chain drive 5 connected to the transmission oil pump 7
11 Hermetic seal
12 Seal of the converter neck 3
13 Lubrication pressure limiting valve 13 of the transmission lubrication oil supply as a whole
14 Duct
15 Outlet point of the duct 14
A Direction of the oil jet emerging from the duct 14

The invention claimed is:

1. An arrangement for supplying lubrication oil to a chain drive (5) which drives a transmission oil supply (7), a transmission oil pump being accommodated within an intermediate plate (6), a motor vehicle component, comprising a torque converter (1), the transmission oil supply being positioned axially offset relative to the torque converter (1), the chain drive (5) comprising a sprocket wheel (9) engaging with a converter neck (3) which is rotationally supported, via a converter neck bearing (4), by a centering plate (2), such that the sprocket wheel and the converter neck being coaxially aligned, the converter neck (3) engaging and driving the sprocket wheel (9) via an entrainment profile (8), the arrangement comprising:

a static hermetic seal (11) being formed radially between the converter neck (3) and the sprocket wheel (9) for suppressing oil flow therebetween from one side of the centering plate (2) to an opposite side of the centering plate (2), the intermediate plate (6) being fixed to the centering plate (2) and comprising a duct (14) therebetween, a lubrication pressure limiting valve (13) communicating with both the transmission lubrication oil supply and the duct, an outlet (15) of the duct being substantially axially aligned and radially spaced from the chain drive (5); and the duct being arranged to direct a flow of oil from the transmission lubrication oil supply to the converter neck seal (12), the converter neck bearing (4) and the chain drive (5).

2. The arrangement according to claim 1, wherein the hermetic seal (11) an O-ring.

3. The arrangement according to claim 1, wherein the hermetic seal (11) an O-ring, the intermediate plate (6), the centering plate (2), the transmission oil supply (7) and the chain drive (5) form a structural group which is preassembled, an outlet (15) of the duct (14) opens substantially radially inwardly with respect to an axis defined the converter neck, the static hermetic seal (11) fluidly separates the outlet (15) of the duct (14) from a toroidal inside space of the torque converter (1), and the intermediate plate is fluidly connected to the converter neck.

4. The arrangement according to claim 1, wherein the duct has only a single inlet and a single outlet so that all of the oil flowing through the lubrication pressure limiting valve (13) is supplied only to the converter neck seal (12), the converter neck bearing (4) and the chain drive (5).

5. An arrangement for supplying lubrication oil to a chain drive (5) for driving a transmission oil pump (7) positioned axially offset relative to a torque converter (1), and the transmission oil pump (7) is embedded in an intermediate plate (6) of a motor vehicle having the torque converter (1), a driven sprocket wheel (9), of the chain drive (5), being mounted in a converter neck (3), which is mounted in a centering plate (2), and the driven sprocket wheel (9) being functionally connected by an axially displaceable driving profile (8) to the converter neck (3), the arrangement comprising:
- a static hermetic seal (11) being provided between the converter neck (3) and the driven sprocket wheel (9) of the chain drive (5) to prevent draining of a toroidal inside space of the torque converter once the vehicle is at rest for a period of time,
- the hermetic seal being arranged in an area of a sliding fit between the converter neck (3) and the sprocket wheel (9),
- for compensating suppression, by the hermetic seal (11), of the lubrication, the lubrication is provided to a converter neck seal (12), a converter neck bearing (4) and the chain drive (5),
- a lubrication pressure limiting valve (13), of the transmission lubrication oil pump being integrated in the intermediate plate (6),
- a duct (14) being formed between the centering plate (2) and the intermediate plate (6) once the centering plate (2) is connected to the intermediate plate (6),
- the transmission oil pump (7) being coupled to the lubrication pressure limiting valve (13) such that excess oil flow emerges from the lubrication pressure limiting valve (13), and
- the duct (14) communicating with the lubrication pressure limiting valve (13) and an outlet (15) of the duct (14) being arranged to direct excess oil to the converter neck seal (12), the converter neck bearing (4) and the chain drive (5).

6. The arrangement according to claim 5, wherein the hermetic seal (11) is an O-ring.

7. The arrangement according to claim 5, wherein the intermediate plate (6), the centering plate (2), the transmission oil pump (7) and the chain drive (5) form a structural group which is preassembled.

8. The arrangement according to claim 5, wherein the intermediate plate (6), the centering plate (2), the transmission oil supply (7) and the chain drive (5) form a structural group which is preassembled.

* * * * *